US010984678B2

(12) United States Patent
Curtis

(10) Patent No.: US 10,984,678 B2
(45) Date of Patent: Apr. 20, 2021

(54) DEVICES AND METHODS FOR DYNAMIC EXTRACORPOREAL MEMBRANE OXYGENATION SIMULATION

(71) Applicant: Curtis Life Research LLC, Indianapolis, IN (US)

(72) Inventor: Paul Stewart Curtis, Indianapolis, IN (US)

(73) Assignee: CURTIS LIFE RESEARCH LLC, Indianapolis, IN (US)

( * ) Notice: Subject to any disclaimer, the term of this patent is extended or adjusted under 35 U.S.C. 154(b) by 139 days.

(21) Appl. No.: 15/566,415

(22) PCT Filed: Apr. 13, 2016

(86) PCT No.: PCT/US2016/027353
§ 371 (c)(1),
(2) Date: Oct. 13, 2017

(87) PCT Pub. No.: WO2016/168348
PCT Pub. Date: Oct. 20, 2016

(65) Prior Publication Data
US 2018/0301062 A1 Oct. 18, 2018

Related U.S. Application Data

(60) Provisional application No. 62/146,884, filed on Apr. 13, 2015.

(51) Int. Cl.
*G09B 23/28* (2006.01)
*G09B 23/30* (2006.01)
*G09B 9/00* (2006.01)

(52) U.S. Cl.
CPC .............. *G09B 23/28* (2013.01); *G09B 9/00* (2013.01); *G09B 23/30* (2013.01)

(58) Field of Classification Search
CPC .......... G09B 23/00; G09B 23/30; G09B 23/28
See application file for complete search history.

(56) References Cited

U.S. PATENT DOCUMENTS

2006/0154359 A1* 7/2006 Hassanein ............ A01N 1/0242
435/284.1
2007/0243512 A1* 10/2007 King ...................... G09B 23/28
434/268
(Continued)

FOREIGN PATENT DOCUMENTS

| WO | 02/26286 A2 | 4/2002 |
|----|----|----|
| WO | 2004/064896 A2 | 8/2004 |
| WO | 2015/047927 A1 | 4/2015 |

OTHER PUBLICATIONS

International Preliminary Report on Patentability dated Oct. 17, 2017 in application No. PCT/US2016/027353.
(Continued)

*Primary Examiner* — Steve Rowland
(74) *Attorney, Agent, or Firm* — Maschoff Brennan

(57) ABSTRACT

The present disclosure generally relates to medical training, and more particularly but not exclusively, to training performed for extracorporeal support techniques such as extracorporeal membrane oxygenation ("ECMO"). In one non-limiting embodiment, a system includes a clamp defining a space to receive a conduit of an ECMO circuit, an articulator operably coupled to the clamp to change a dimension of the space, and a simulator module communicatively coupled to the articulator to transmit control signals. Additional and/or alternative embodiments, forms, features and aspects are disclosed herein.

7 Claims, 13 Drawing Sheets

(56) References Cited

U.S. PATENT DOCUMENTS

2014/0099617 A1* 4/2014 Tallman, Jr. ......... G09B 23/288
　　　　　　　　　　　　　　　　　　　　　　434/262
2016/0220746 A1* 8/2016 Gipson ............... A61M 1/3666

OTHER PUBLICATIONS

'Extracorporeal membrane oxygenation' (Wikipedia). Mar. 20, 2015. Retrieved from the Internet on Jun. 20, 2015. URL: <https://web.archive.org/web/20150320195132/http://en.wikipedia.org/wiki/Extracorporeal_membrane_oxygenation>.

International Search Report and Written Opinion dated Jul. 26, 2016 in International Patent Application No. PCT/US16/27353.

"Experimental assessment of the impact of asymptomatic gas emboli on the vessel wall" (GU). Aug. 2013. Retrieved on Jun. 20, 2016. URL: <http://www.worldscientific.com/doi/abs/10.1142/S0219519413500644?journalCode=jmmb>.

Anderson, Jodee M. et al., "Simulating Extracorporeal Membrane Oxygenation Emergencies to Improve Human Performance, Part I: Methodologic and Technologic Innovations", Simulation in Healthcare: journal of the Society for Simulation in Healthcare, Jan. 1, 2016 (Jan. 1, 2016), pp. 220-227, XP055528329, United States, DOI: 10.1097/01.S1H.0000243550.24391.ce, Retrieved from the internet: URL: https://pdfs.journals.lww.com/simulationinhealthcare/2006/00140/Simulating_Extracorporeal_Membrane_Oxygenation.4.pdf.

Extended European Search Report dated Nov. 12, 2018 in European Application No. 16780666.0.

Morris, Richard W. et al., "Orpheus" Cardiopulmonary Bypass Simulation System, The Journal of the American Society of Extra-Corporeal Technology, Jan. 1, 2007, p. 228-233.

Examination Report dated Sep. 14, 2020 in European Application No. 16780666.0; 9 pages.

* cited by examiner

FIG. 4C

DEVICES AND METHODS FOR DYNAMIC EXTRACORPOREAL MEMBRANE OXYGENATION SIMULATION

CROSS-REFERENCE TO RELATED APPLICATIONS

This application is a national stage entry of International Patent Application No. PCT/US2016/027353 filed Apr. 13, 2016, which claims the benefit of U.S. Patent Application No. 62/146,884, filed Apr. 13, 2015, titled DEVICES AND METHODS FOR DYNAMIC EXTRACORPOREAL MEMBRANE OXYGENATION SIMULATION. The contents of these applications are incorporated herein by reference in their entirety.

BACKGROUND

The present disclosure generally relates to medical training, and more particularly but not exclusively, to training performed for extracorporeal support techniques such as extracorporeal membrane oxygenation ("ECMO").

The claimed subject matter is not limited to embodiments that solve any disadvantages or that operate only in environments such as those described above. Rather, this background is only provided to illustrate examples of where the present disclosure may be utilized.

SUMMARY

The present disclosure generally relates to medical training, and more particularly but not exclusively, to training performed for extracorporeal support techniques such as extracorporeal membrane oxygenation ("ECMO").

In one non-limiting embodiment, a system includes a clamp defining a space to receive a conduit of an ECMO circuit, an articulator operably coupled to the clamp to change a dimension of the space, and a simulator module communicatively coupled to the articulator to transmit control signals. In one form, the simulator module includes a wireless interface to communicatively couple with a user device.

In another non-limiting embodiment, a system includes a pump configured to displace gas and to removably couple with a connector on a conduit of an ECMO circuit, and a simulator module communicatively coupled to the pump to transmit control signals for the pump to displace gas into the conduit of the ECMO circuit. In one form, the simulator module includes a wireless interface to communicatively couple with a user device.

In yet another non-limiting embodiment, a system includes a clamp defining a space to receive a conduit of an ECMO circuit, an articulator operably coupled to the clamp to change a dimension of the space, a simulator module communicatively coupled to the articulator to transmit control signals, and a display module coupled to the simulator module and configured to generate simulated parameters to be displayed to a user via a display. In one form, the simulator module includes a wireless interface to communicatively couple with a user device.

In still another non-limiting embodiment, a system includes an ECMO circuit that includes one or more conduits extending between a number of components, and one or more flow regulating members positioned about at least one of the one or more conduits. In one form, the one or more flow regulating members is structured to adjustably compress an exterior of the at least one of the one or more conduits in order to control flow through the at least one of the one or more conduits.

In yet another non-limiting embodiment, a system includes an ECMO circuit including one or more conduits extending between a number of components, at least one connecting member coupled with at least one of the one or more conduits, and at least one injection device coupled with the at least one connecting member. In one form, the injection device is structured to inject a quantity of one or more gases or ambient air through the connecting member and into the conduit.

In still another non-limiting embodiment, a method for ECMO training includes operating an ECMO simulation circuit that includes at least one conduit and at least one flow regulating device positioned about the conduit at a first location to simulate a first operating condition, the flow regulating device being structured to adjustably compress an exterior of the conduit in order to control flow through the conduit; and during operation of the ECMO simulation circuit, repositioning the flow regulating device from the first location to a second location positioned about the conduit.

This Summary introduces a selection of concepts in a simplified form that are further described below in the Detailed Description. This Summary is not intended to identify key features or essential characteristics of the claimed subject matter, nor is it intended to be used as an aid in determining the scope of the claimed subject matter.

Additional features and advantages will be set forth in the description which follows, and in part will be obvious from the description, or may be learned by practice. The features and advantages may be realized and obtained by means of the instruments and combinations particularly pointed out in the appended claims. These and other features will become more fully apparent from the following description and appended claims.

BRIEF DESCRIPTION OF THE DRAWINGS

FIGS. 4A-4E illustrate non-limiting example representations of a user application on a user device.

DETAILED DESCRIPTION

For purposes of promoting an understanding of the present disclosure, reference will now be made to the following embodiments and specific language will be used to describe the same. It will nevertheless be understood that no limitation of the scope of the disclosure is thereby intended, such alterations and further modifications in the described subject matter, and such further applications of the disclosed principles as described herein being contemplated as would normally occur to one skilled in the art to which the disclosure relates.

Figure 1:
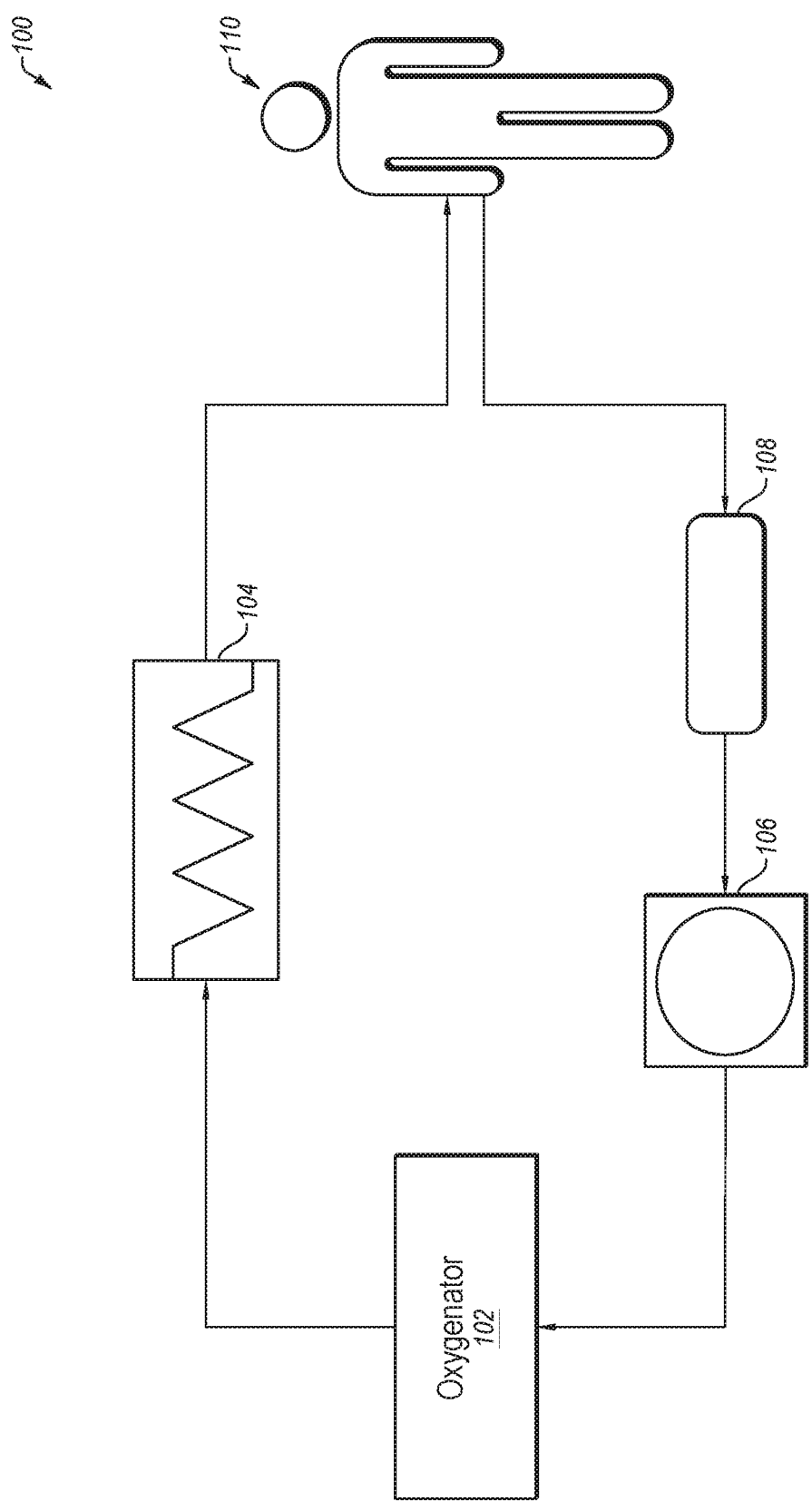
FIG. 1 is a schematic illustration of one non-limiting form of an extracorporeal membrane oxygenation ("ECMO") circuit.

The present disclosure generally relates to medical training, and more particularly but not exclusively to training for extracorporeal support techniques such as extracorporeal membrane oxygenation ("ECMO"), a technique in which blood is removed from the body, oxygenated, and then returned to the body. ECMO procedures may be performed using an ECMO circuit. For example, FIG. 1 is a schematic illustration of one non-limiting form of an ECMO circuit 100.

The ECMO circuit 100 may be used to provide cardiac and respiratory support to a patient 110 with damaged cardiac or respiratory systems, or both. For example, if the heart and/or lungs of the patient 110 no longer serve their function, the ECMO circuit 100 may be used to provide life support by oxygenating the blood of the patient 110. The ECMO circuit 100 may be fluidly coupled to the body of the patient 110 to receive blood from the venous system of the patient 100 and to oxygenate the received blood via an oxygenator that serves as an artificial lung. The oxygenated blood may then be returned to the arterial system of the patient 110.

The ECMO circuit 100 includes an oxygenator 102 configured to oxygenate blood from the patient 110. A pump 106 is fluidly coupled between the oxygenator 102 and the patient 110 and directs liquid from the patient 110 to the oxygenator 102. A reservoir 108 is positioned between the patient 110 and the pump 106 to facilitate operation of ECMO circuit 100. For example, the reservoir 108 may be used to measure characteristics of fluid flowing from the body of the patient 110 to control the operation of the pump 106 without disturbing the fluid flow. The ECMO circuit 100 also includes a heat exchanger 104 fluidly coupled between the oxygenator 102 and the patient 110. The heat exchanger 104 may be used to control the temperature of the fluid in the ECMO circuit 100 prior to being directed back into body of the patient 110.

In operation, fluid (e.g., blood) travels from the body of the patient 110 to the oxygenator 102 via the pump 106. As the fluid travels to the pump 106, it passes through the reservoir 108 where characteristics of the fluid flow are obtained such that the operation of the pump 106 may be controlled. For example, the flow rate or pressure of the fluid at the reservoir 108 may be used to control the displacement of the pump 106. The fluid is directed by the pump 106 to the oxygenator 102 that oxygenates the fluid. The oxygenated fluid travels from the oxygenator 102 to the heat exchanger 104. The heat exchanger 104 may increase or decrease the temperature of the fluid to a suitable temperature prior to entering the body of the patient 110. For example, the heat exchanger 104 may increase the temperature of the fluid to a temperature substantially at, or within a range of, the normal or standard temperature of blood inside the body of the patient 110. The oxygenated fluid travels from the heat exchanger 104 into the body of the patient 110.

The portion of the ECMO circuit 100 between the patient 110 and the oxygenator 102, including the reservoir 108 and the pump 106, is commonly referred to as the venous portion, and other portion of the ECMO circuit 100 between the patient 110 and the oxygenator 102, including the heat exchanger 104, is commonly referred to as the arterial portion.

The ECMO circuit 100 illustrated in FIG. 1 provides one non-limiting example of an operating environment in which the devices and methods disclosed herein may be employed. However, the devices and methods may be utilized in other operating environments and/or other configurations, including other configurations of the ECMO circuit 100.

ECMO procedures may be associated with a variety of risks and complications such as bleeding, thromboembolism, cannulation-related Heparin-induced thrombocytopenia, veno-arterial complications, pulmonary hemorrhage, cardiac thrombosis, coronary or cerebral hypoxia. Such risks and complications may be reduced or eliminated through training so healthcare providers are more readily capable of, inter alia, identifying potential complications, responding to circumstances to avoid complications, and/or decreasing the effects of complications when they arise.

FIGS. 2A-2D are schematic illustrations of non-limiting forms of a circuit 200 for ECMO procedure training. The circuit 200 may simulate ECMO circuits, such as the ECMO circuit 100, to facilitate training of healthcare providers to perform ECMO procedures. As such, the illustrated circuit 200 includes aspects described with respect to the ECMO circuit 100 such as the oxygenator 102, the heat exchanger 104, the pump 106, and the reservoir 108. The circuit 200 may include other non-illustrated elements that may correspond to ECMO circuits simulated by the circuit 200.

The circuit 200 includes a simulated patient 210 rather than the patient 110 of the ECMO circuit 100 of FIG. 1. The patient 210 may be any suitable representation of the patient 110. For example, the patient 210 may be a fluid supply such as a reservoir of saline or water that simulates blood in a patient's body. The patient 210 may include a volume of fluid corresponding to a volume of fluid in a patient's body. In some forms, the patient 210 may include a representation of a human body such as a mannequin. In such configurations, a fluid supply may be positioned inside of the mannequin to simulate fluid within the human body. The circuit 200 includes a venous portion extending from the patient 210 to the oxygenator 102 via the reservoir 108 and the pump 106 and an arterial portion extending from the oxygenator 102 to the patient 210 via the heat exchanger 104.

As illustrated in FIGS. 2A-2D, flow regulating devices in the form of clamps 202, 204 are positioned at various positions in the circuit 200 and may be used to simulate various real-life situations encountered during ECMO procedures for training purposes. One or both of the clamps 202, 204 may be a scissor clamp operably coupled with an articulator. The articulator may be any suitable actuator for example a stepper motor, servo motor, electromagnetic actuator, or any combination thereof. The scissor clamp may be positioned around a conduit of the circuit 200 such that the conduit is received in a space defined by the scissor clamp. The stepper motor may actuate the scissor clamp to control flow through the conduit. The stepper motor may actuate the scissor clamp to change the size of the space defined by the scissor clamp thereby changing the size of an opening in the conduit. For example, the conduit of the circuit 200 may exhibit a sufficient degree of flexibility or compressibility such that its shape and size are influenced and changed by action of the scissor clamp. The stepper motor may decrease the size of the opening to restrict fluid flowing through the conduit and/or increase the size of the opening to permit fluid to flow through the conduit.

Although the circuit 200 of FIG. 2A-2D illustrates two clamps 202, 204, the circuit 200 may include any suitable number of clamps at any suitable positions on the circuit 200 to simulate various different training circumstances. In other configurations, the circuit 200 may include any suitable device that regulates, directs or controls the flow of fluid through the circuit 200. For example, the circuit 200 may include valves in addition to or in lieu of one or more of the clamps 202, 204.

Figure 2A:
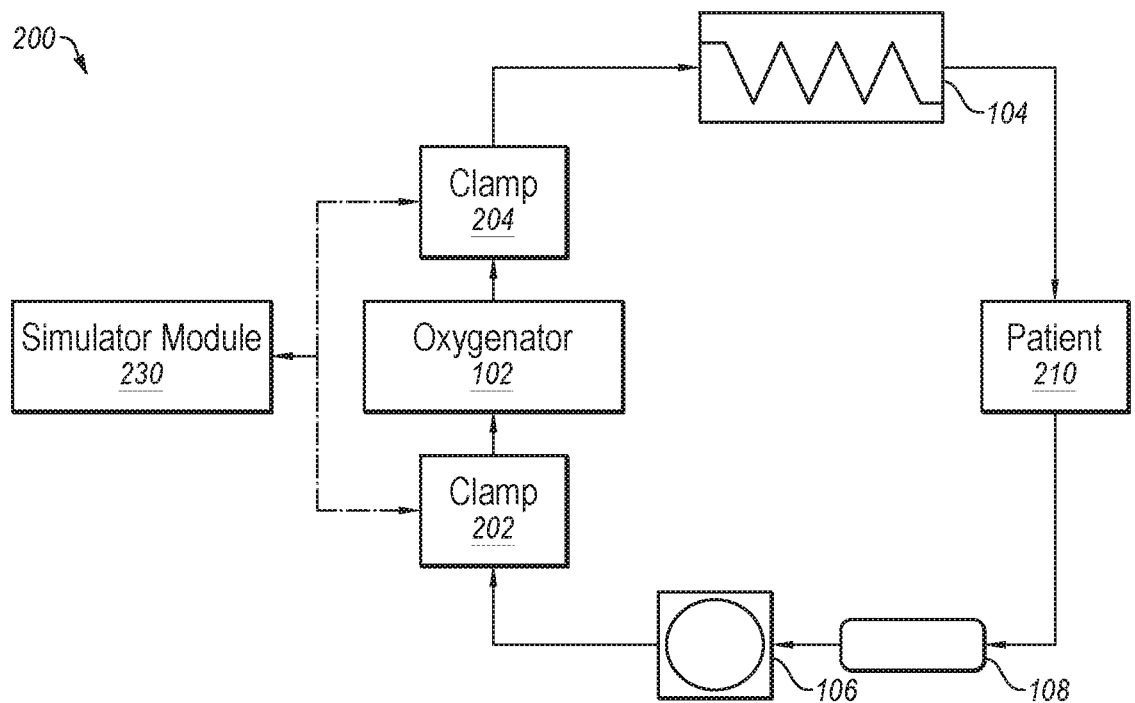
FIGS. 2A-2D are schematic illustrations of non-limiting forms of a circuit for ECMO procedure training.

As illustrated for example in FIG. 2A, in some configurations the clamp 202 is positioned between the pump 106 and the oxygenator 102 and the clamp 204 is positioned between the oxygenator 102 and the heat exchanger 104. The clamps 202 and 204 positioned on opposite sides of the oxygenator 102 may be used to simulate oxygenator failure circumstances for training. One or both of the clamps 202 and 204 may restrict flow through the circuit 200 to simulate partial or complete failure of the oxygenator 102. Additionally or alternatively, the clamps 202 and 204 may be used to simulate line obstructions in the circuit 200. For example, the clamp 202 may restrict flow to simulate a line obstruction between the pump 106 and the oxygenator 102. In another example, the clamp 204 may restrict flow to simulate a line obstruction between the oxygenator 102 and the heat exchanger 104. Additionally or alternatively, the clamps 202 and 204 may be used to simulate thrombosis in the circuit 200.

The clamps 202, 204 of the circuit 200 may be repositioned in the circuit 200 to simulate different circumstances for training. For example, the clamps 202 and 204 may be positioned elsewhere in the circuit 200 to simulate line obstructions in other portions of the circuit 200. The clamp 204 may be repositioned from the position of FIG. 2A to the position of FIG. 2B between the heat exchanger 104 and the patient 210. Additionally or alternatively, the clamp 202 may be repositioned from the position of FIG. 2A to the position of FIG. 2D between the patient 210 and the reservoir 108. The clamps 202, 204 may also be positioned in other positions in the circuit 200 not illustrated in FIGS. 2A-2D. Given the interaction of the clamps 202 and 204 with the external surface of the conduit, it should be appreciated that they may be readily moved to various locations in the circuit 200 without disassembling the circuit 200, thereby facilitating real-time changes to the circuit 200 to allow a more diverse number of events to be presented to a trainee during a single ECMO simulation session and without exposing the interior of the circuit 200 to ambient conditions.

Figure 2B:
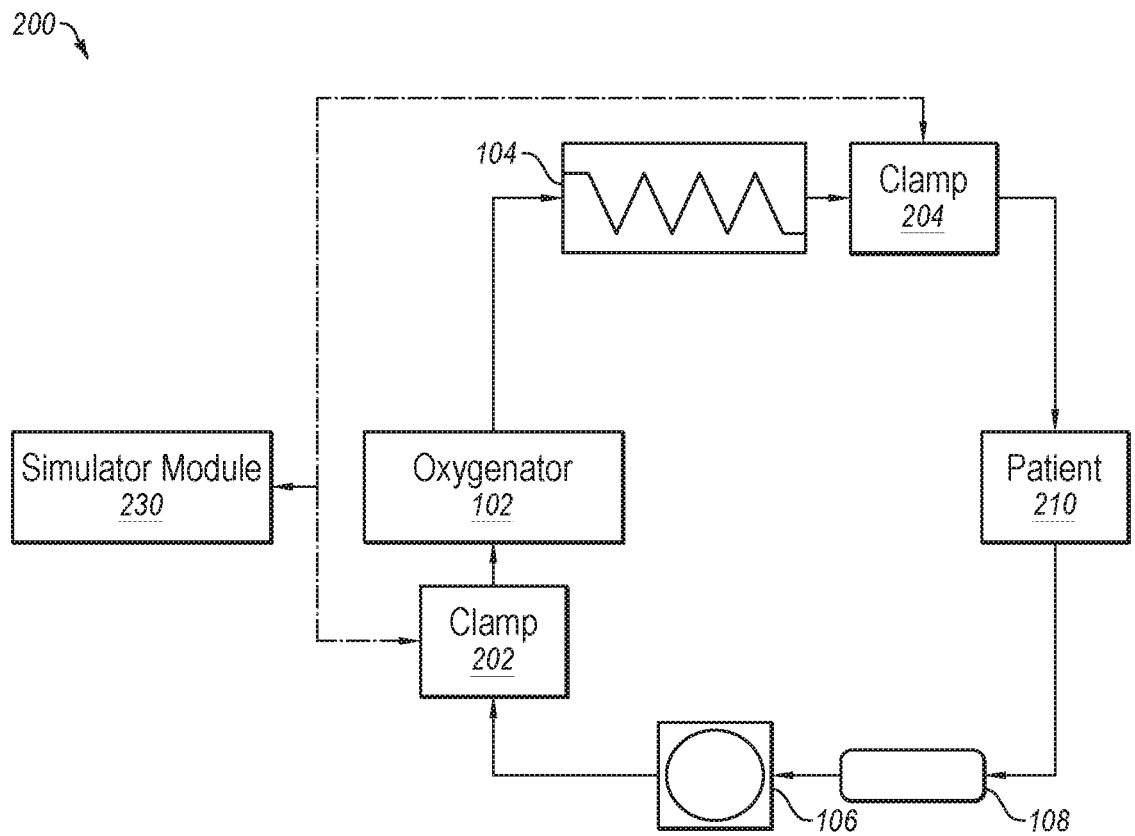

Turning to FIG. 2B, in some configurations the clamp 202 is positioned between the pump 106 and the oxygenator 102 and the clamp 204 is positioned between the heat exchanger 104 and the patient 210. The clamp 202 may be used to simulate pump failure circumstances by restricting flow through the circuit 200 to simulate partial or complete failure of the pump 106. Additionally or alternatively, the clamp 204 may restrict flow to simulate a line obstruction between the heat exchanger 104 and the patient 210.

Figure 2C:
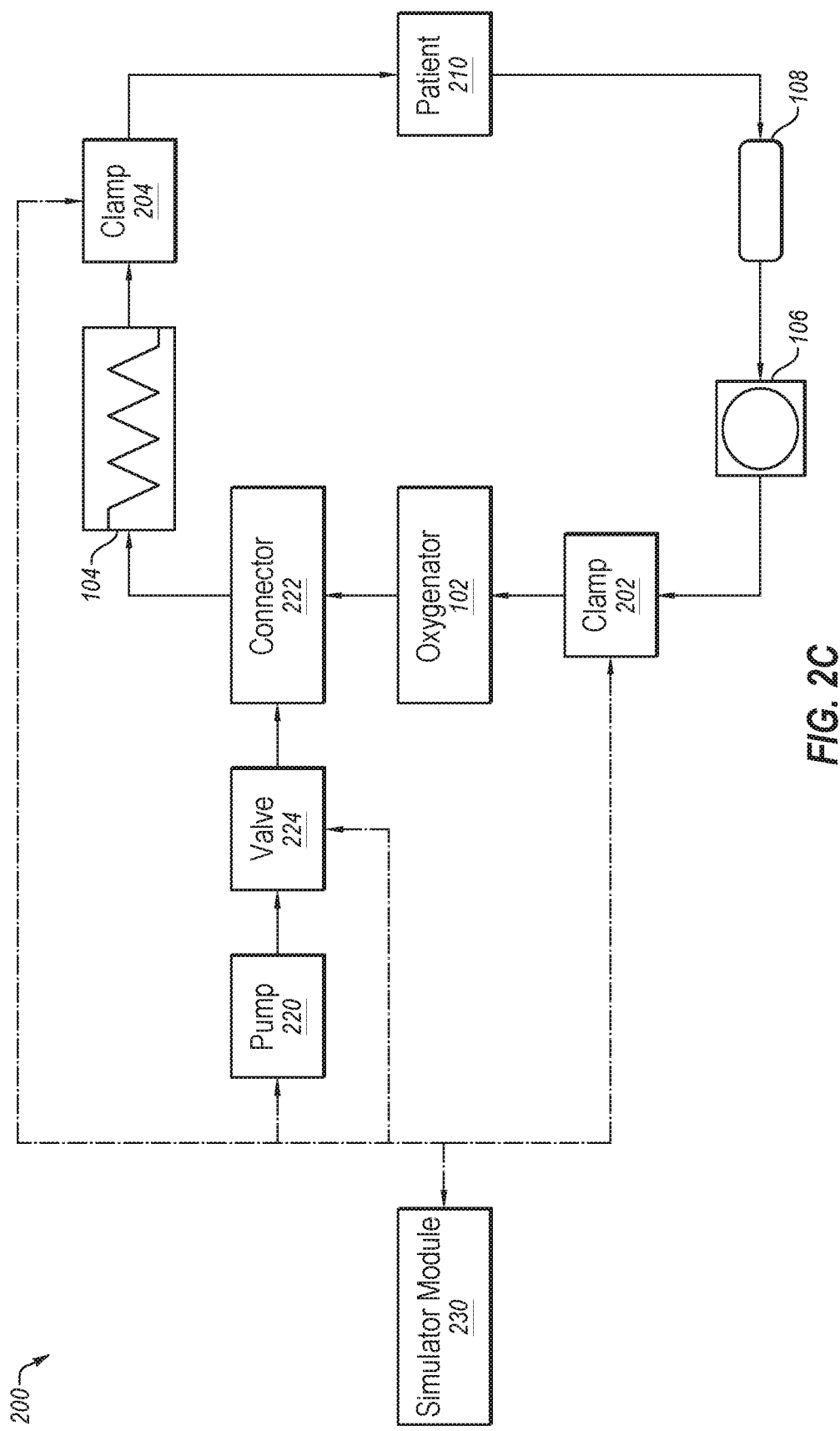

As illustrated for example in FIG. 2C, the circuit 200 includes a pump 220 and/or a valve 224 coupled to the circuit 200 via a connector 222. As illustrated, the valve 224 is positioned between the pump 220 and the connector 222. The valve 224 may be a solenoid valve that may permit a gas, ambient air or another fluid to enter the circuit 200. The valve 224 may be used to simulate, for example, a leak in the circuit 200 by permitting gases to enter into the circuit 200 and/or a fluid to escape the circuit 200.

The pump 220 may be used to simulate, for example, air emboli by injecting gases into the circuit 200. The pump 220 may be a brushless air pump configured to displace air, such as ambient air, into various portions of the circuit 200. The connector 222 may be a fitting configured to couple with conduits of the circuit 200, such as a Luer style connector. As illustrated, the connector 222 is positioned between the oxygenator 102 and the heat exchanger 104. In other configurations, the connector 222 may couple the pump 220 and/or the valve 224 at any suitable position in the circuit 200. Furthermore, the circuit 200 may include any suitable number of connectors to couple one or more pumps 220 at various positions in the circuit 200. Similarly, in one non-illustrated form, the circuit 200 includes a plurality of connectors 222 positioned at different locations to facilitate positioning of one or more pumps 220 and/or one or more valves 224 at different locations. In this form, a trainer operating the circuit 200 could readily move the pump 220 and/or the valve 224 to a different location in the circuit 200 in order to simulate different events.

In some configurations, the venous portion of the circuit 200 includes a negative pressure (i.e. pressure that is less than ambient atmospheric pressure) and the arterial portion of the circuit 200 includes positive pressure (i.e. pressure that is greater than ambient atmospheric pressure). When the connector 222 is coupled to the venous portion of the circuit 200, the valve 224 may permit ambient air to enter the circuit 200, driven by the negative pressure differential. When the connector 222 is coupled to the arterial portion of the circuit 200, the valve 224 may permit fluid to escape the circuit 200, driven by the positive pressure differential.

In some circumstances, the valve 224 may be used to equalize pressure in the circuit 200 with respect to the ambient pressure. For example, the valve 224 may permit gases and/or liquids to enter or exit the circuit 200 when the pressure in the circuit 200 is less than or greater than ambient pressure. In this manner, the valve 224 may be used to prevent excessive negative or positive pressure buildup in the circuit 200. Excessive negative or positive pressure may be pressure levels outside of a suitable operating pressure range for the circuit 200.

Figure 2D:
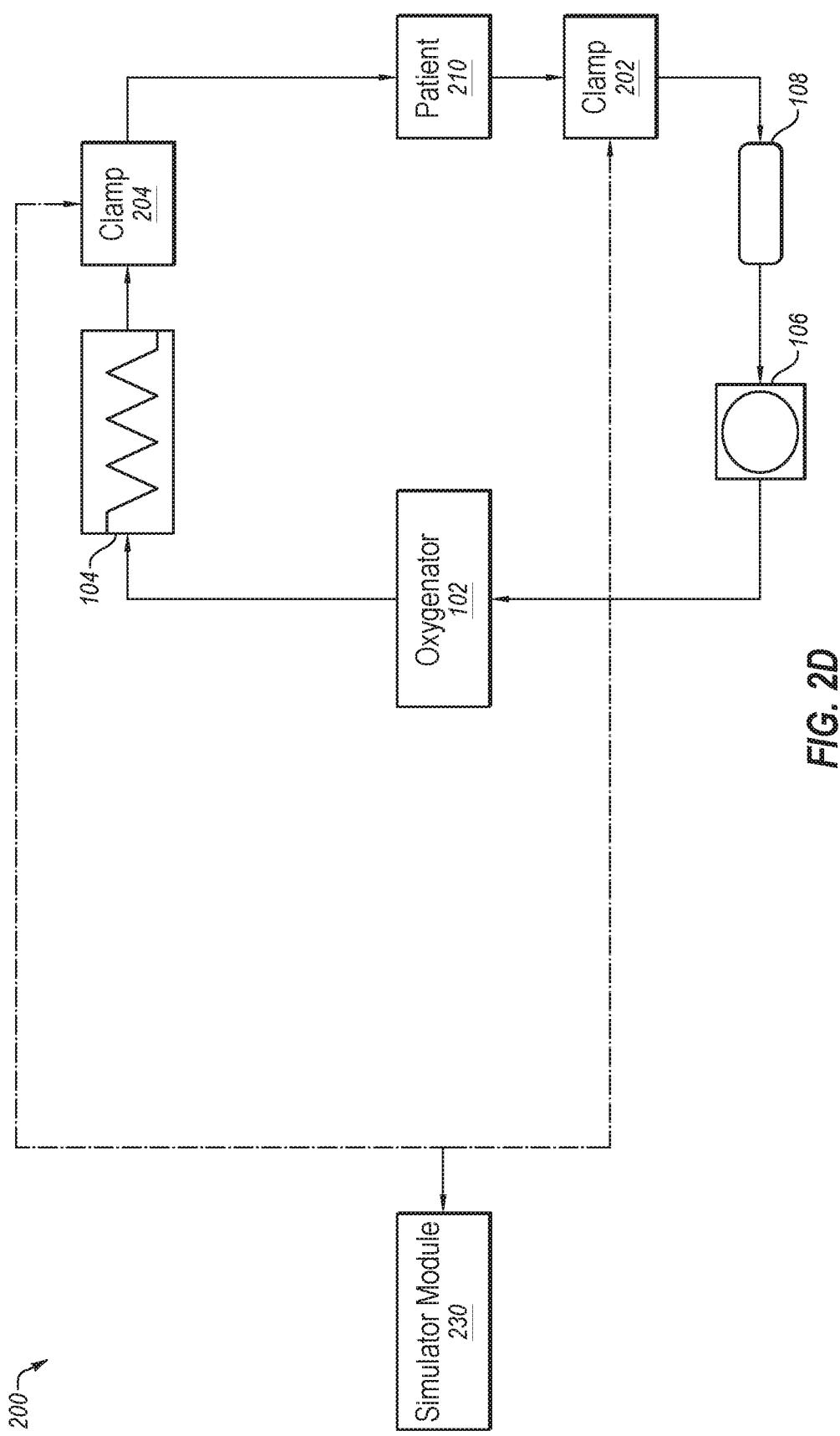

Turning to FIG. 2D, in some configurations the clamp 202 is positioned between the patient 210 and the reservoir 108 and the clamp 204 is positioned between the heat exchanger 104 and the patient 210. In the illustrated configuration, the clamp 202 and the clamp 204 may be used to simulate various circumstances in the circuit 200. The clamp 202 may restrict flow to simulate a line obstruction between the patient 210 and the reservoir 108. Additionally or alternatively, the clamp 204 may restrict flow to simulate a line obstruction between the heat exchanger 104 and the patient 210.

With collective reference to FIGS. 2A-2D, for example, a simulator module 230 is communicatively coupled to the clamps 202, 204, the pump 220 and the valve 224. The simulator module 230 transmits power and control signals to operate the clamps 202, 204, the pump 220, and the valve 224.

Figure 3:
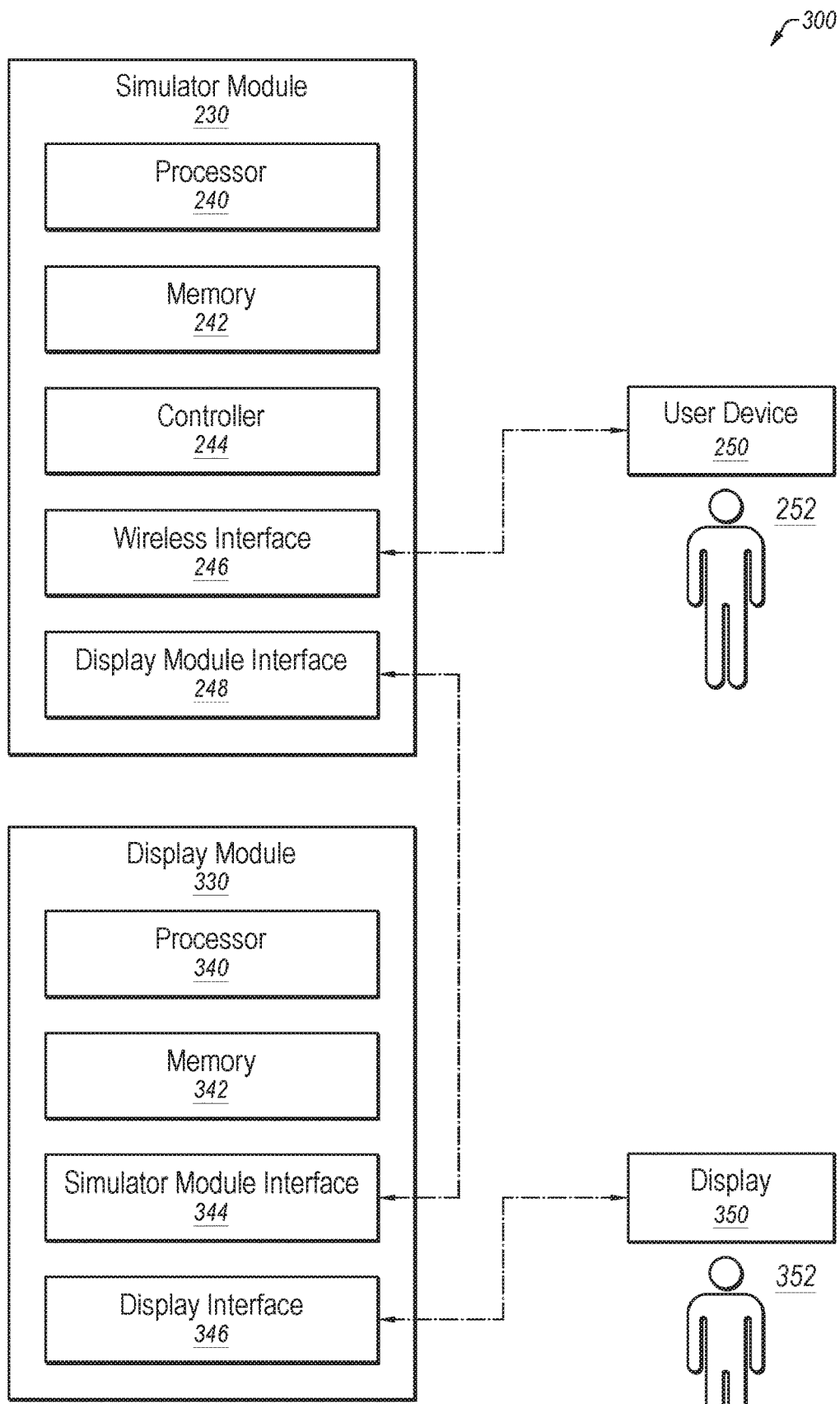
FIG. 3 illustrates a simulator system that may be used in connection with the circuit of FIGS. 2A-2D.

FIG. 3 illustrates a simulator system 300 that may be used in connection with the circuit 200 of FIGS. 2A-2C. The system 300 may include the simulator module 230 and a display module 330.

The simulator module 230 includes a processor 240, a memory 242, a controller 244, a wireless interface 246, a display module interface 248, or some combination thereof. The processor 240, the memory 242, the controller 244, the wireless interface 246, and the display module interface 248 are communicatively coupled to one another in any suitable configuration. As illustrated, the system 300 also includes the display module 330 communicatively coupled to the simulator module 230.

The processor 240 may include any suitable special-purpose or general-purpose computer, computing entity, or processing device including various computer hardware or software modules and may be configured to execute instructions stored on any applicable computer-readable storage media. For example, the processor 240 may be a microprocessor, a microcontroller, a digital signal processor (DSP), an application-specific integrated circuit (ASIC), a field-programmable gate array (FPGA), or any other digital or analog circuitry configured to interpret and/or to execute program instructions and/or to process data. The processor 240 may interpret and/or execute program instructions and/or process data stored in the memory 242. In some embodiments, the processor 240 may fetch program instructions and load the program instructions in the memory 242. The processor 240 may execute the program instructions after the program instructions are loaded into the memory 242.

The memory 242 may include computer-readable storage media for carrying or having computer-executable instructions or data structures stored thereon. The computer-readable storage media may be any available media that may be accessed by a computing system and/or a processor (e.g., 240). The computer-readable storage media may include tangible and/or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium that may be used to carry or store desired program code in the form of computer-executable instructions or data structures and that may be accessed by a general-purpose or special-purpose computer. Any combinations of the above may also be included within the scope of computer-readable storage media.

The controller 244 may be configured to control the clamps 202, 204 the pump 220, and the valve 224 of FIGS. 2A-2D. The controller 244 may be communicatively coupled with the clamps 202, 204, the pump 220, and the valve 224 to transmit power and control signals.

The wireless interface 246 may permit the simulator module 230 to communicate with the user device 250. The interface 246 may permit communication using any communication protocol, interface, standard, etc. In some embodiments, the interface 246 communicates with the user device 250 via a Bluetooth connection. In other embodiments, the interface 246 may permit communication using a wired connection.

The user device 250 may be a personal computer, hand-held device, mobile phone, multi-processor system, consumer electronics device, network PC, minicomputer, mainframe computer, laptop computer, portable electronic device, cellular/mobile/smart phone, tablet personal computer, personal digital assistant, and/or any other suitable device.

The display module interface 248 may permit the simulator module 230 to communicate with the display module 330. The interface 248 may permit communication using any communication protocol, interface, standard, etc. In some embodiments, the interface 248 may be a Universal Serial Bus (USB) interface. In other embodiments, the interface 248 may be a wireless interface that permits wireless communication between the simulator module 230 and the display module 330. For example, the wireless interface may be a Bluetooth interface or another suitable wireless interface.

The display module 330 may include a processor 340, a memory 342, a simulator module interface 344, a display interface 346, or some combination thereof. The processor 340 and the memory 342 may include any suitable aspects described with respect to the processor 240 and the memory 242 of the simulator module 230.

The simulator module interface 344 may permit the display module 330 to communicate with the simulator module 230. The interface 344 may permit communication using any communication protocol, interface, standard, etc. In some embodiments, the interface 344 may be a Universal Serial Bus (USB) interface. In other embodiments, the interface 344 may be a wireless interface that permits wireless communication between the simulator module 230 and the display module 330. For example, the wireless interface may be a Bluetooth interface or another suitable wireless interface.

The display interface 346 may permit the display module 330 to communicate with a display 350. The interface 346 may permit communication using any communication protocol, interface, standard, etc. In some embodiments, the interface 346 may be a high-definition multimedia interface (HDMI) interface. In other embodiments, the interface 346 may be a wireless interface that permits wireless communication between the display module 330 and the display 350. For example, the wireless interface may be a Bluetooth interface, a wireless local area network interface (e.g., WiFi) or another suitable wireless interface. The display interface 346 may be configured to display data to a user 352 on the display 350. In some configurations, the display 350 may be a computer display or similar device. In further configurations, the display 350 may be part of a user device such as a personal computer, hand-held device, mobile phone, multi-processor system, consumer electronics device, network PC, minicomputer, mainframe computer, laptop computer, portable electronic device, cellular/mobile/smart phone, tablet personal computer, personal digital assistant, and/or any other suitable device.

In some configurations, the user 252 may be an instructor or trainer in a training exercise for the user 352 that is in training. The user 252 may interact with the simulator module 230 and the display module 330 via the user device 250. In some configurations, the user device 250 may include an application configured to permit the user 252 to interact with the simulator module 230 and the display module 330.

The display module 330 may generate simulated parameters and the display 350 may display the simulated parameters to the user 352 engaged in the training exercise. For example, in some configurations, the display 350 may simulate a blood monitor. The user 352 may view the simulated parameters on the display 350. The simulated parameters may be generated by the display module 330 either automatically or based at least in part on input from the user 252. The display module 330 may update and display the simulated parameters in real time. The simulated parameters may include partial pressure of oxygen ($PaO_2$), partial pressure of $CO_2$ ($PaCO_2$), arterial saturation of oxygen ($SaO_2$), venous saturation of oxygen ($SvO_2$), arterial temperature, venous temperature, Hemoglobin (Hb), Hematocrit (Hct), flow rate, activated clotting time/activated coagulation time (ACT), thromboelastogram (TEG), partial thromboplastin time (PTT) or activated partial thromboplastin time (aPTT), or any suitable combination thereof. In some circumstances, arterial and venous temperatures may vary when using venous to arterial ECMO. In some circumstances, simulated ACT tests may be used to monitor anticoagulation effects, such as high-dose heparin before, during, and/or shortly after procedures that require intense anticoagulant administration.

In further configurations, the display 350 may simulate a patient monitor. In such configurations, the simulated parameters may include intracranial pressure (ICP), bispectral index (BIS), heart rate, patient oxygen saturation, non-invasive blood pressure, central venous pressure (CVP), arterial blood pressure, pulmonary artery pressure, pulmonary wedge pressure (PWP), respiratory rate, cardiac output, electrocardiogram data, arterial blood gas values (ABG), peripheral temperature, core temperature, end-tidal $CO_2$, percutaneous transhepatic cholangiography (PTHC or PTC), pH, levels of anesthetic agents, or any suitable combination thereof. The simulated parameters may be displayed in a numerical display, graphical display, waveform display, and/or other suitable display configurations.

In some configurations, the simulated blood monitor and the simulated patient monitor may each be displayed on separate displays. In such configurations, the display module 330 may generate the simulated parameters for display to the user 352 on two separate displays, one for the simulated blood monitor and another one for the simulated patient monitor.

The patient monitor may simulate patient-related complications in the human body such a cardiac and pulmonary anomalies. The patient monitor may be configured to display the simulated parameters to indicate that the patient is experiencing complications rather than failures in the circuit 200. Simulated scenarios or complications may include cardiac failure, cardiac tamponade, cardiac arrhythmia, cardiac arrest, pulmonary edema, pulmonary contusion, pulmonary embolism, acute respiratory distress syndrome, pneumonia, and/or other complications. The simulated scenarios or complications may include any suitable changes to the simulated parameters.

The user 252 may interact with the display module 330 via the user device 250 to change the simulated parameters displayed to the user 352. For example, the user 252 may use an application on the user device 250 to change the simulated parameters. In some configurations, the user 252 may activate an algorithm using the application to automatically update the simulated parameters for the user 352 such that they correspond with an activity being performed by the clamps simulating certain events.

The user 252 may interact with the simulator module 230 to simulate circumstances for training. For example, the user 252 may control the clamps 202, 204 and/or the pump 220 via the simulator module 230 to simulate circumstances such as oxygenator failure, heat exchanger failure, pump failure, conduit blockage, air emboli, pump chatter, cannulation problems, hypovolemia, and/or hypervolemia. The user 352 engaged in a training exercise may respond to the simulated circumstances. The user 252 may evaluate and/or instruct the user 352 in responding to the simulated circumstances.

In some configurations, the user 252 may manipulate the system 300 out of sight or in a different location than the user 352. In some configurations, the user 352 is an ECMO technician or a person training to be an ECMO technician. The system 300 may simulate problems that may be encountered in practice by the ECMO technician.

In some configurations, the user device 250 may include a user application configured to permit the user 252 to interact with the simulator module 230 and the display module 330, to simulate circumstances for training. FIGS. 4A-4E and 5B-5C illustrate example representations of the user application on a user device, such as the user device 250. With attention to FIGS. 4A-4E, the user application will be discussed in further detail. The user application may include a number of modules that a user may select to interact with the system 300. The modules may include a thrombosis module, an embolism module, a blood monitor module, and a hypovolemia module.

Figure 4A:
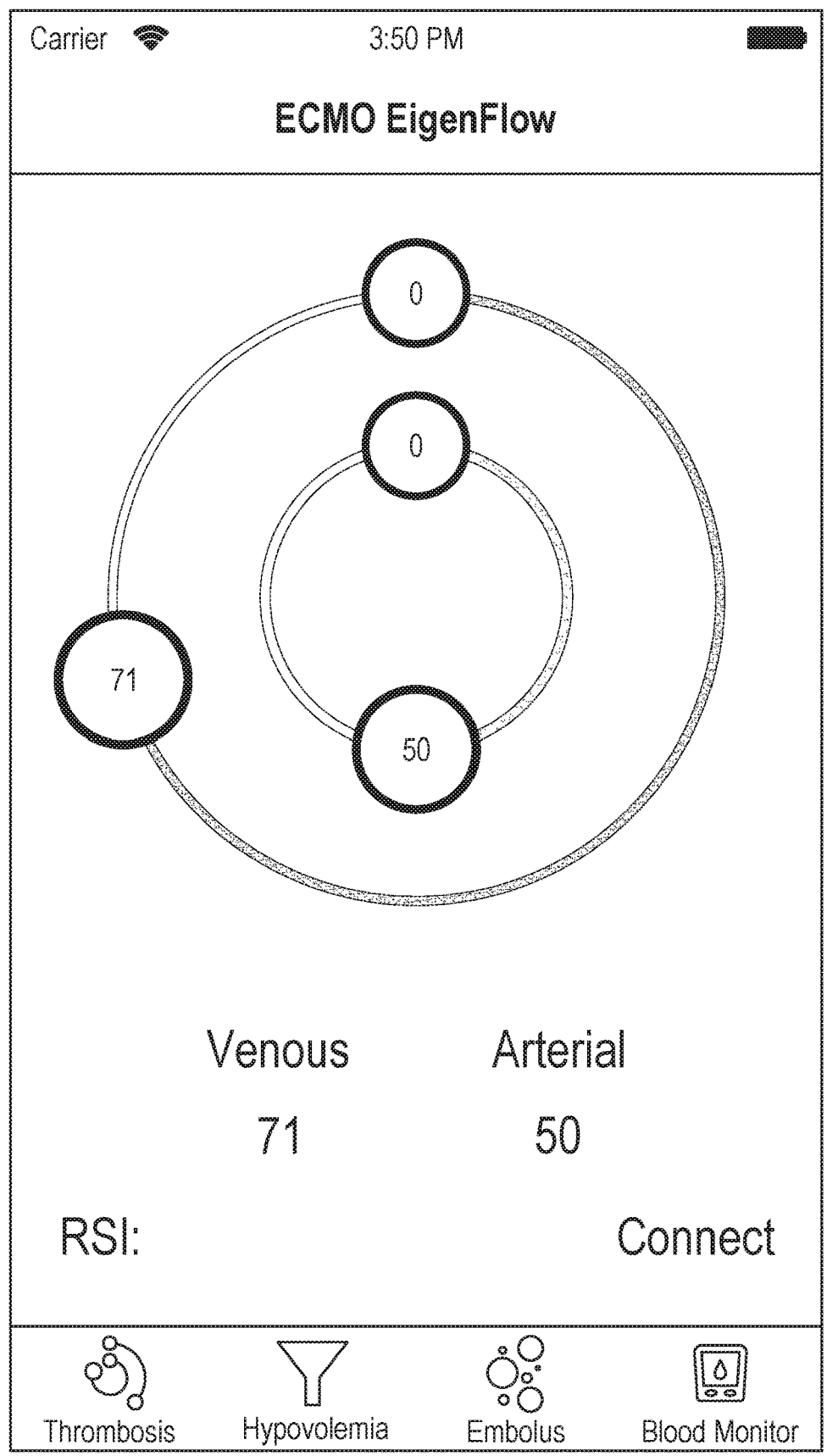

FIG. 4A illustrates an example thrombosis module of the user application. The thrombosis module may be a user interface for the user to initiate simulated thrombosis circumstances. As illustrated, the thrombosis module may display values corresponding to the clamps of a circuit, such as the clamps 202, 204 of the circuit 200. In some configurations, the values may correspond to the amount of flow restricted by the clamps 202, 204. In the illustrated configuration, the values include a venous value that may correspond to flow through the venous portion of the circuit 200 and restricted by the clamp 202. The values also include an arterial value that may correspond to flow through the arterial portion of the circuit 200 and restricted by the clamp 204.

In some configurations, the values may be scalar values between 0 and 100 corresponding to a percentage of flow through the arterial and venous portions of the circuit 200 and/or restricted at the clamps 202, 204. At a value of 0, the clamps 202, 204 may entirely restrict flow such that 0% of fluid flows through the circuit 200 at the clamps 202, 204. At a value of 100, the clamps 202, 204 may not restrict flow such that 100% of fluid flows unrestricted through the circuit 200 at the clamps 202, 204. In FIG. 4A, the venous value is set to 71 representing 71% of flow through the venous portions of the circuit 200 and the arterial value is set to 50 representing 50% of flow through the arterial portions of the circuit 200. Similar independent variations between these values are possible.

The thrombosis module may permit the user to set the values to control the operation of the clamps 202, 204. For example, the user may change the arterial and venous values to change the amount of fluid restricted by the clamps 202, 204.

Figure 4B:
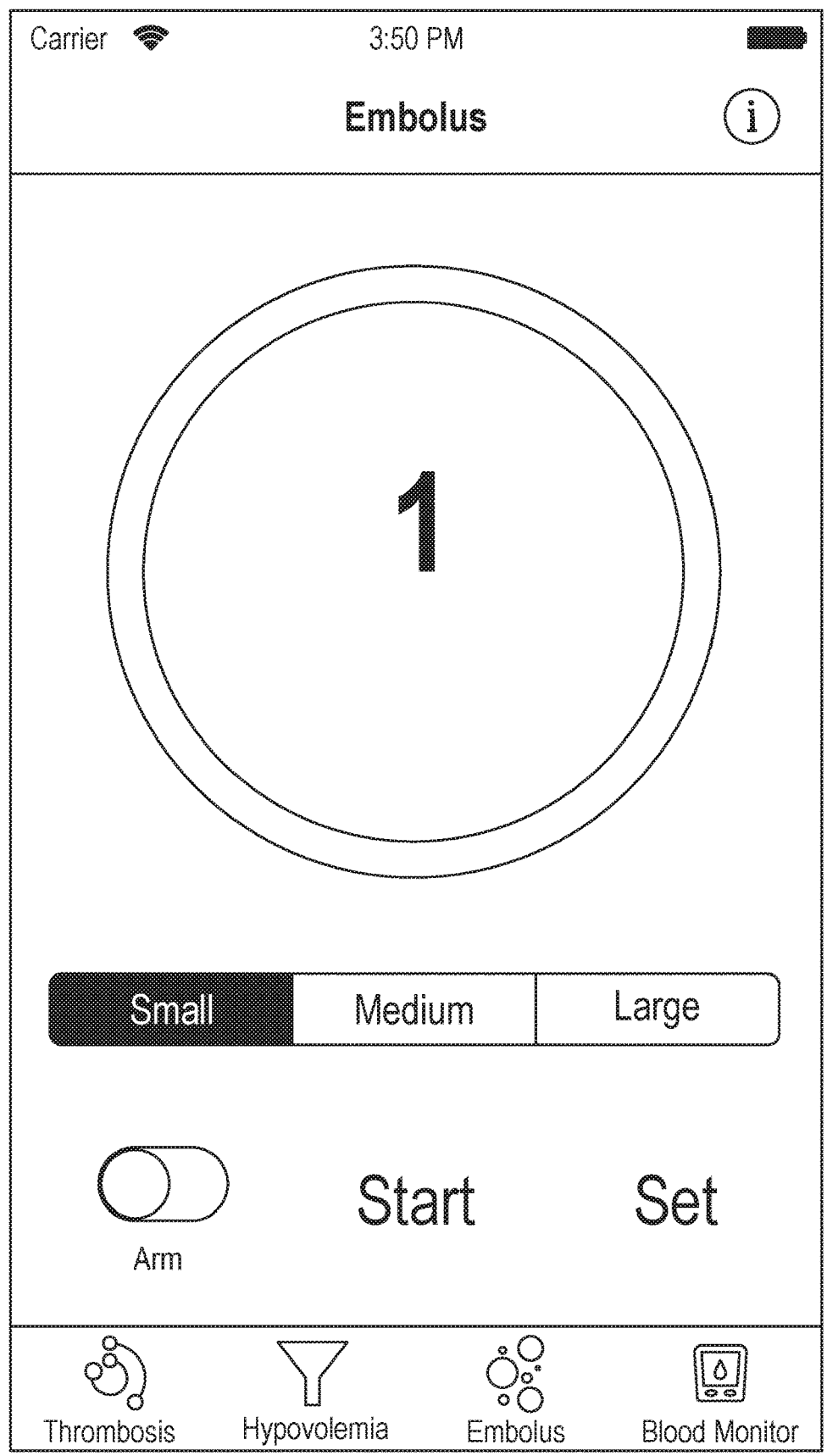

FIG. 4B illustrates an example embolism module of the user application. The embolism module may be a user interface for the user to initiate simulated embolism circumstances. For example, the embolism module may permit the user to operate the pump 220 to create a simulated air embolism. The embolism module may permit a user to select a magnitude of an embolism to be created by the pump 220. As illustrated, the user may select between small, medium and large embolisms and the user has selected a small embolism, although other variations are contemplated. Once a magnitude is selected, the user may start a countdown to initiate the simulated embolism by selecting "Start." After the user initiates the countdown, the embolism module will display a countdown and initiate the simulated air embolism when the countdown is complete. In the illustrated configuration, the countdown begins at 30 seconds and counts down to 0, although other configurations are contemplated and may be set by the user.

Figure 4C:
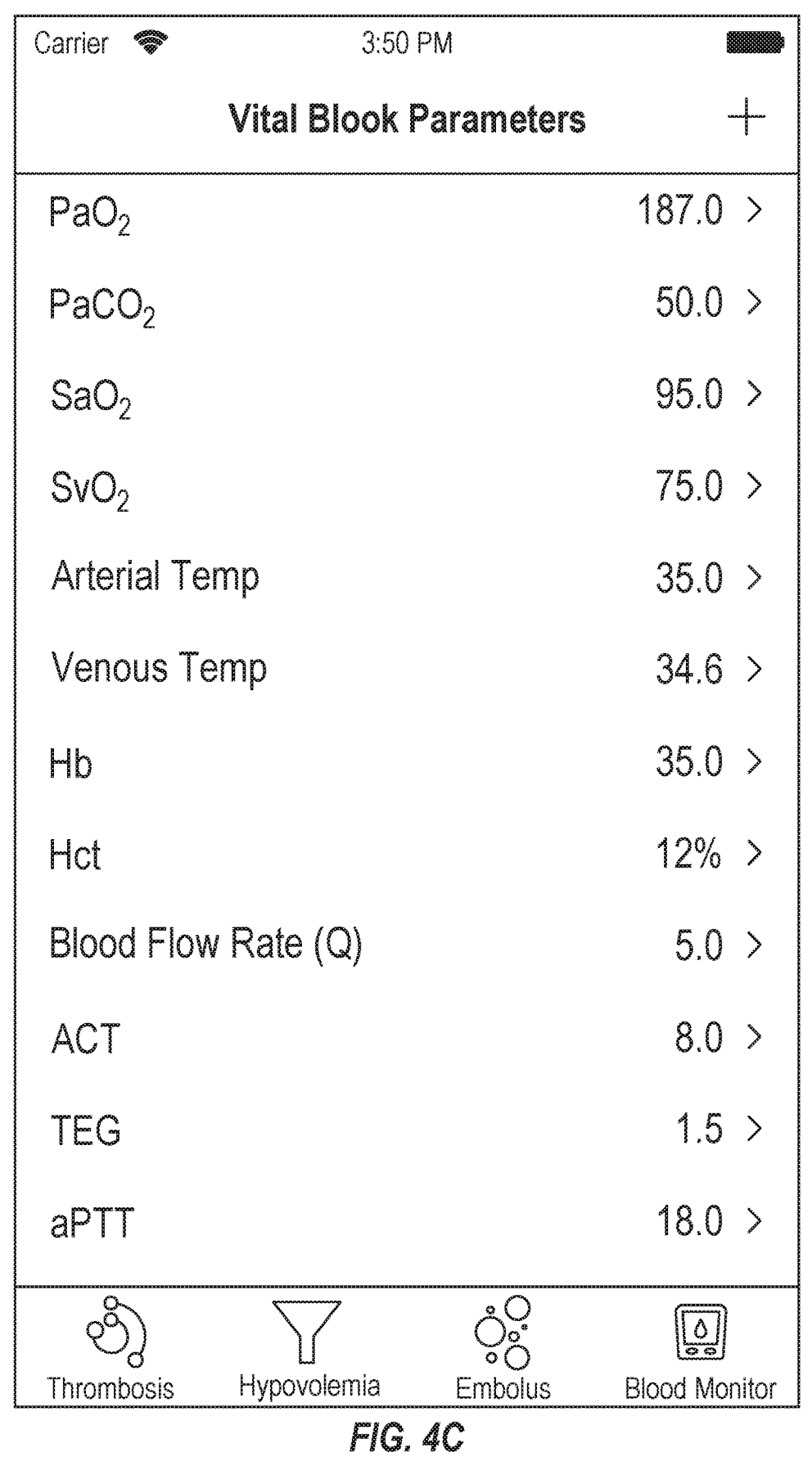
Figure 4D:

FIG. 4C illustrates an example blood monitor module of the user application. As illustrated, the simulated parameters of the blood monitor module may include $PaO_2$, $PaCO_2$, $SaO_2$, $SvO_2$, arterial temperature, venous temperature, Hb, Hct, blood flow rate, ACT, TEG, PTT or aPTT, or any suitable combination thereof. The user may use the blood monitor module to control the simulated parameters displayed by the display 250 via the display module 330. The user may change the simulated parameters displayed by the display 250 by setting the simulated parameters of the blood monitor module. Additionally or alternatively, the user may set the simulated parameters to activate algorithms to initiate simulated circumstances, such as thrombosis circumstances and embolism circumstances. Once the user selects a parameter to be changed, the user application may display a module permitting the user to set the selected parameter. FIG. 4D illustrates an example ACT module that may be a user interface that permits the user to change the ACT simulated parameter. The ACT value may represent a time for blood in the circuit 200 to clot. As illustrated, the ACT module may permit the user to set an ACT value in seconds. The ACT module may permit the user to set a trend for the ACT value that may represent the time frame for the set ACT value to be implemented by the system 300. In FIG. 4D, the user has selected an ACT value of 119 seconds that is to be implemented immediately ("now").

A changed parameter may be implemented by changing data displayed on the display 250 either instantaneously or over time. Additionally or alternatively, a changed parameter may be implemented by the system 300 by initiating simulated circumstances. For example, the system 300 may initiate a thrombosis circumstance when a simulated value is set to a specific value or within a range of values.

The thrombosis circumstance may be initiated at the user application, the simulator module, or both. In some configurations, the user application may automatically set a value of the thrombosis module in response to the changed parameter. For example, when a user sets an ACT value of less than 120 seconds, the ACT module may automatically change the venous value of the thrombosis module to 20 (e.g., 20% open). Additionally or alternatively, when a user sets an ACT value of less than 120 seconds, the user application may send a signal to the simulator module 230 to restrict flow through the clamp 202 on the venous portion of the circuit 200 to 20%. In other configurations, the thrombosis circumstance may be initiated at other values or ranges of values and the thrombosis circumstance may be implemented in other suitable manners.

Figure 4E:
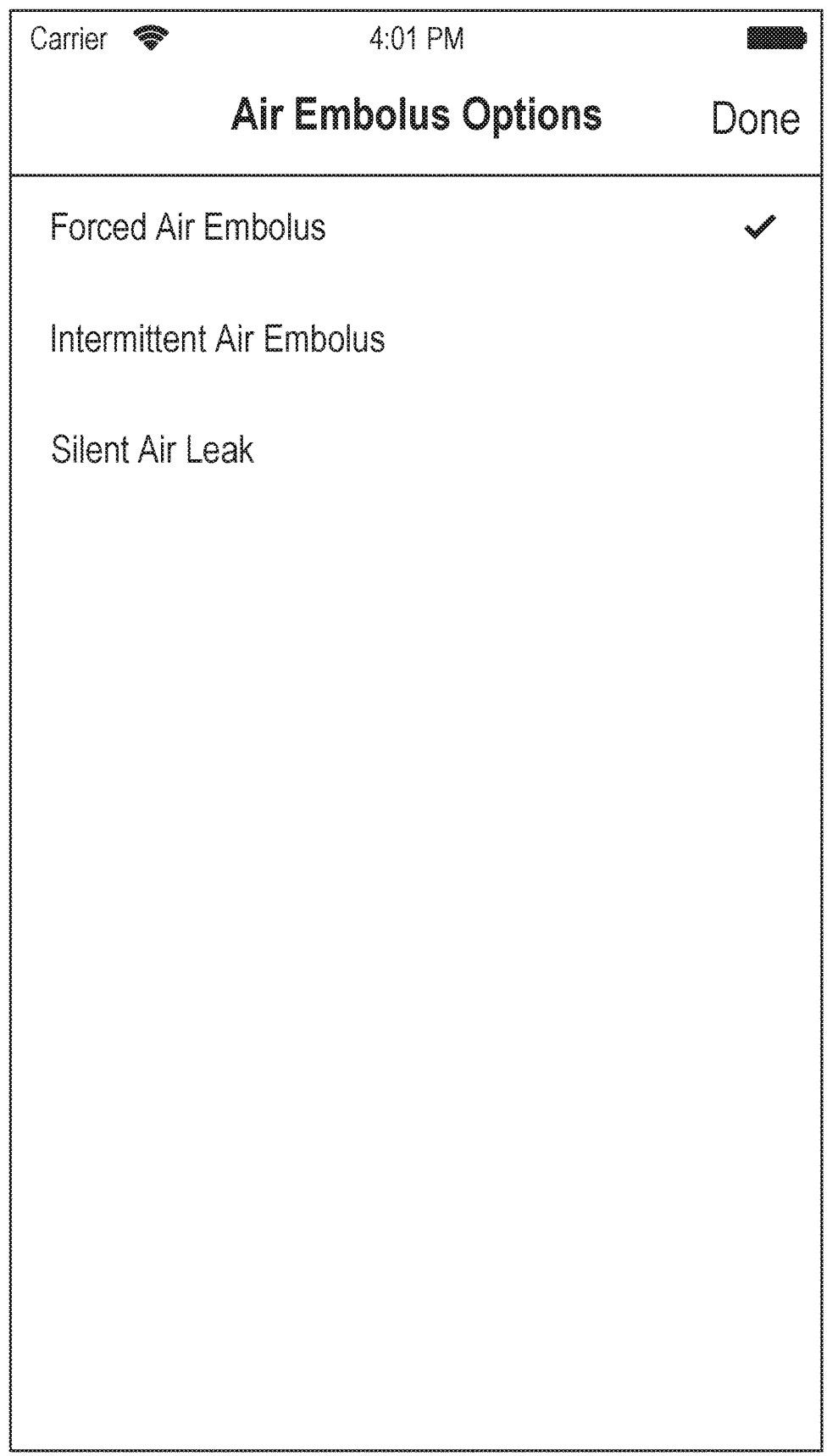

FIG. 4E illustrates another example of the embolism module of the user application. As illustrated, the embolism module may include options to select the type of embolus to be simulated. For example, the embolism module may include options to simulate a forced air embolus, an intermittent air embolus, and a silent air leak. When a simulated embolus option is selected, the system 300 may implement simulated circumstances in the circuit 200. For example, selecting one of the options may activate the pump 220 and/or the valve 224 of the circuit 200 (see, for example FIG. 2C). The embolism module may permit the user to set the values to control the operation of the pump 220 and/or the valve 224. For example, to simulate to simulate the forced air embolus, the system 300 may activate the pump 220 and/or open the valve 224 to force air into the circuit 200. In another example, to simulate to simulate the intermittent air embolus, the system 300 may intermittently activate the pump 220 and/or open the valve 224 to force air into the circuit 200. In yet another example, to simulate the silent air leak, the system 300 may open the valve 224 to permit air to enter the circuit 200.

In some configurations, the system 300 may be used to simulate blood volume leaving the circuit 200 and/or blood volume entering the circuit 200. For example, valves, pumps or other connectors may be coupled to the circuit 200 to permit withdrawal of fluid from the circuit 200. The fluid may be withdrawn into a reservoir to simulate blood volume lost in the circuit 200. In further configurations, valves, pumps, or other connectors may permit fluid to be added to the circuit 200. The fluid may be added to the circuit 200 from a reservoir storing a volume of fluid to simulate blood volume added to the circuit 200. The valve or connectors may be operated, for example, by the user 252 via the user device 250 and/or the simulator module 230.

Figure 5A:
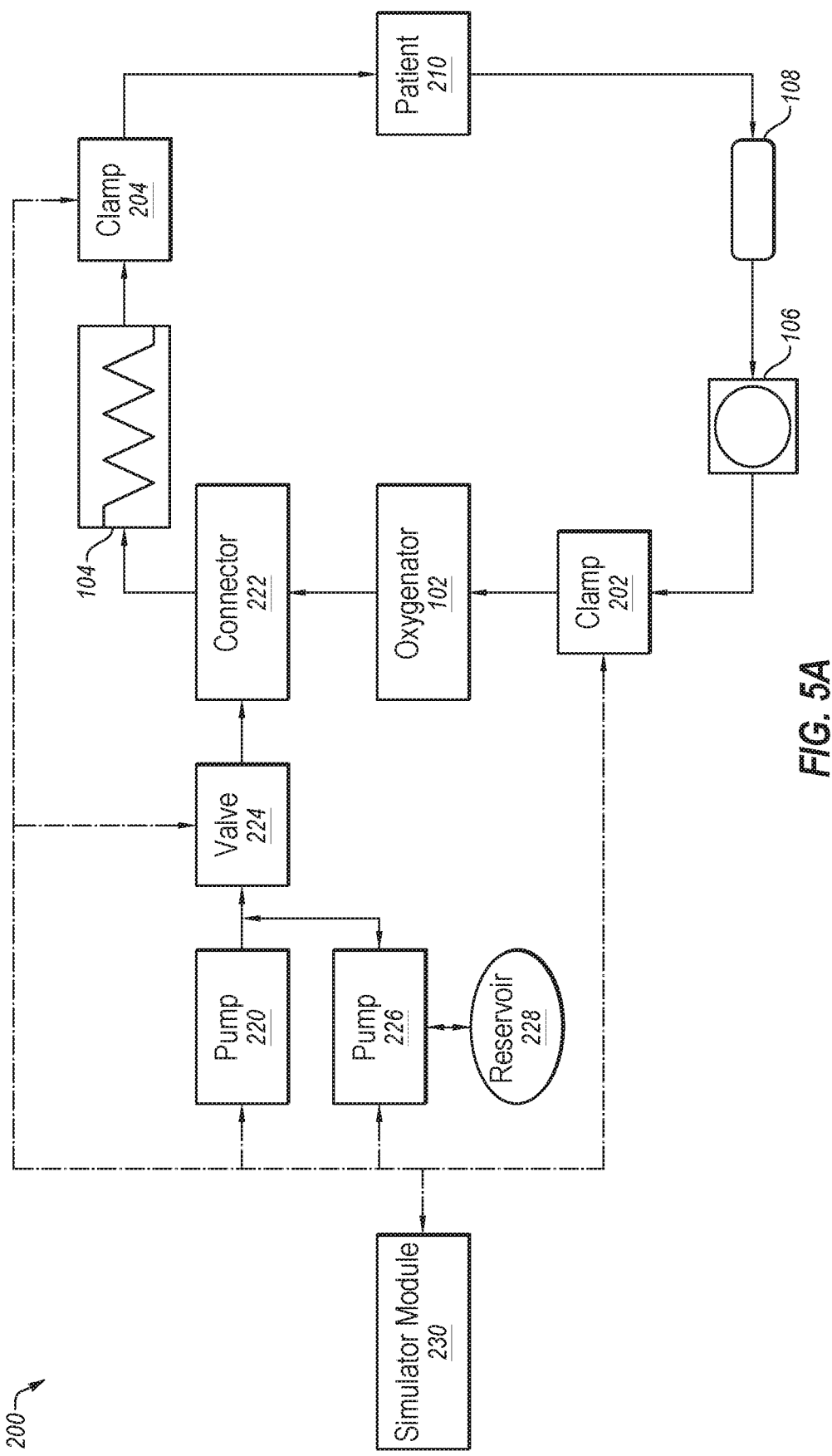
FIG. 5A illustrates another schematic illustration of a non-limiting form of a circuit for ECMO procedure training.

FIG. 5A illustrates an example configuration of the circuit 200 that may be used to simulate hypovolemia (i.e., decreased blood volume) and/or hypervolemia (i.e., excess blood volume). As illustrated, the circuit 200 may include a pump 226 coupled to a reservoir 228. In some configurations, the pump 226 is a diastolic pump. The pump 226 may be used to simulate, for example, hypovolemia by withdrawing fluid from the circuit 200 into the reservoir 228. In another example, the pump 226 may be used to simulate hypervolemia by adding fluid to the circuit 200 from the reservoir 228. As illustrated, the pump 226 is coupled between the pump 220 and the valve 224 to add or remove fluid via the connector 222. In other configurations, the pump 226 may be coupled at other portions of the circuit 200 and/or with other connectors. The simulator module 230 is communicatively coupled to the pump 226 to transmit power and control signals to operate the pump 226.

Figure 5B:
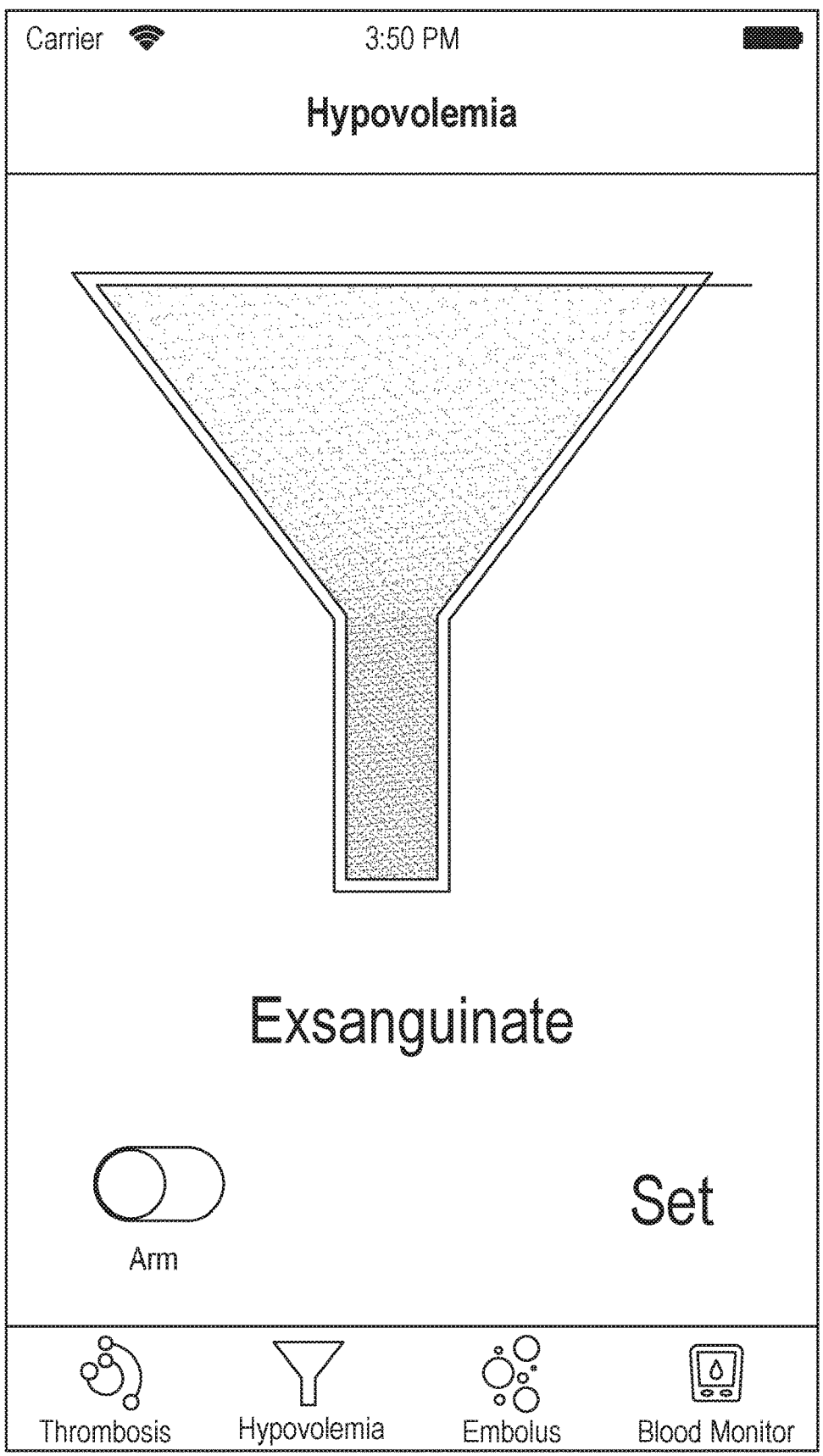
FIGS. 5B-5C illustrate non-limiting example representations of a user application on a user device.
Figure 5C:
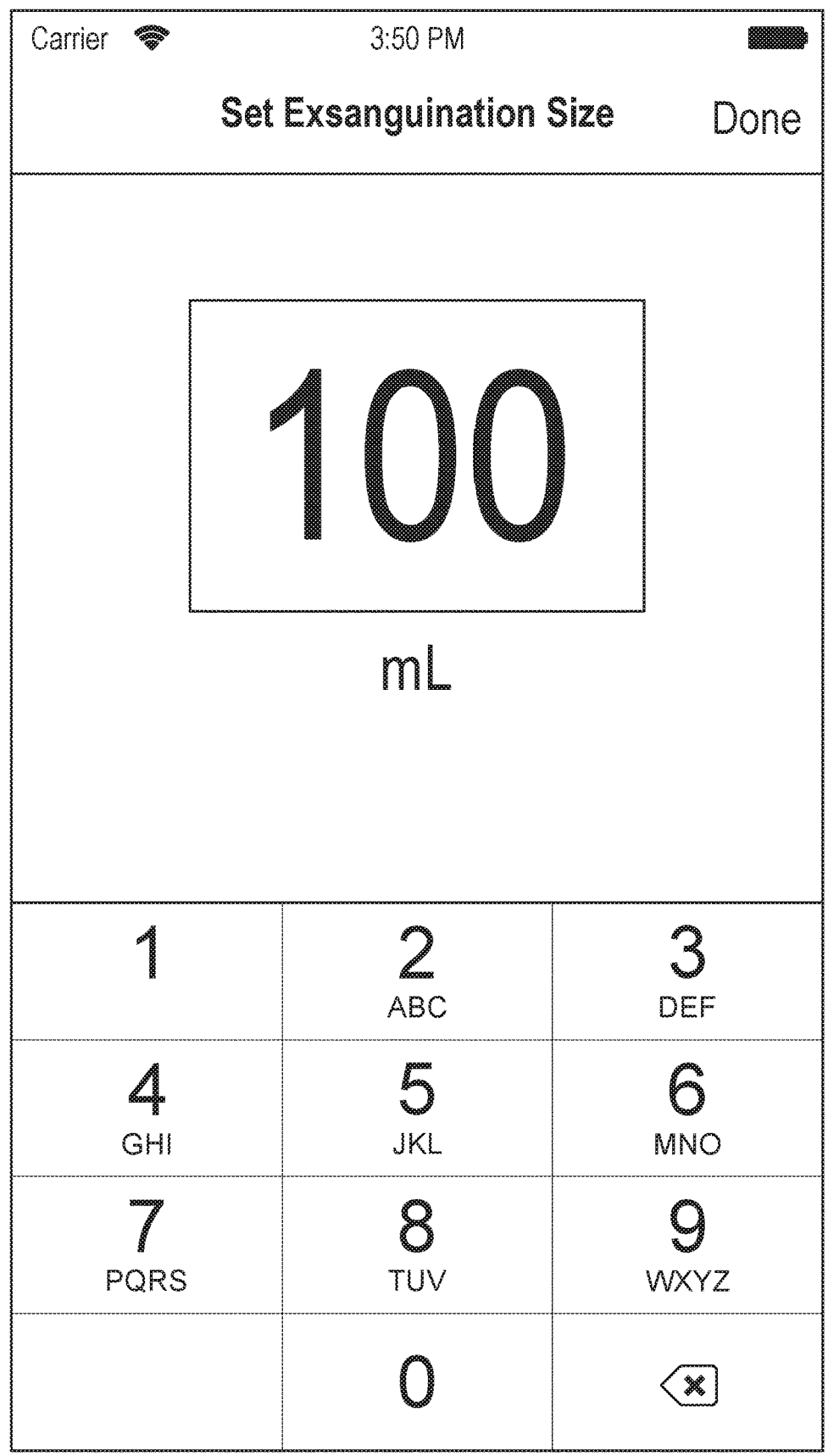

As illustrated in FIGS. 5B-5C, the user application may include a hypovolemia module. A user may interact with the hypovolemia module to initiate simulated hypovolemia in the circuit 200. In some configurations, the hypovolemia module may also be used to initiate simulated hypervolemia in the circuit 200. In such configurations, the hypovolemia module may be considered a hypovolemia/hypervolemia module.

As illustrated in FIG. 5B, the hypovolemia module may include a graphical display that the user may use to select a volume of fluid to exsanguinate or remove from the circuit 200. In some configurations, the user may select a volume of fluid to exsanguinate by touching a portion of the graphical display. As illustrated, the hypovolemia module may include options to arm and set the hypovolemia module to remove fluid from the circuit 200. In configurations of the user application used to simulate hypervolemia, the graphical display may be at least partially inverted to permit a user to select a volume of fluid to add to the circuit 200 to simulate hypervolemia.

As illustrated in FIG. 5C, the hypovolemia module may include a user interface for the user to select a size or volume to exsanguinate or add to the circuit 200. In some configurations, the user may select values corresponding to milliliters (mL) of fluid to be added or removed from the circuit 200. After the values for the volume of fluid to be exsanguinated from the circuit 200 is set, the user may activate the module to simulate hypovolemia. In such circumstances, the system 300 may initiate the simulated circumstances by sending power and control signals to the pump 226 and/or the valve 224 to remove fluid from the circuit 200. In further configurations, after the values for the volume of fluid to be added to the circuit 200 is set, the user may activate the module to simulate hypervolemia. In such circumstances, the system 300 may initiate the simulated circumstances by sending power and control signals to the pump 226 and/or the valve 224 to add fluid to the circuit 200.

In some configurations, the graphical display of the hypovolemia module may include a visual indicator that indicates the progress of the simulated hypovolemia or hypervolemia. For example, as fluid is being removed from the circuit 200 the amount of fluid removed may be graphically indicated on the graphical display. In another example, as fluid is being added to the circuit 200 the amount of fluid added may be graphically indicated on the graphical display.

In some embodiments, a system may include a clamp, an articulator, and a simulator module. The clamp may define a space to receive a conduit of an ECMO circuit. The articulator may be operably coupled to the clamp to change a dimension of the space. The simulator module may be communicatively coupled to the articulator to transmit control signals. The simulator module may include a wireless interface to communicatively couple with a user device.

In some aspects, the clamp may be positioned around the conduit in the ECMO circuit between an oxygenator and a pump. In other aspects, the clamp may be positioned around the conduit in the ECMO circuit between an oxygenator and a heat exchanger. In further aspects, the clamp may be positioned around the conduit in the ECMO circuit between a heat exchanger and a simulated patient.

In some embodiments of the system, the simulator module operates the articulator based on inputs received at the user device to simulate obstructions in the conduit. In some embodiments, the system may include a display module coupled to the simulator module. The display module may be configured to generate simulated parameters to be displayed to a user via a display.

In some embodiments, the system may include a second clamp defining a second space to receive a second conduit of the ECMO circuit and a second articulator operably coupled to the clamp to change a dimension of the second space.

In further embodiments, a system may include a pump and a simulator module. The pump may be configured to displace gas. The pump may be configured to removably couple with a connector on a conduit of an ECMO circuit. The simulator module may be communicatively coupled to the pump to transmit control signals for the pump to displace gas into the conduit of the ECMO circuit. The simulator module may include a wireless interface to communicatively couple with a user device. In some aspects, the connector on the conduit may be positioned between an oxygenator and a heat exchanger in the ECMO circuit.

In some embodiments, the system may include a clamp defining a space to receive a second conduit of the ECMO circuit and an articulator operably coupled to the clamp to change a dimension of the space. In some embodiments, the simulator module may be configured to activate the pump based on inputs received at the user device. In some aspects, activating the pump generates a simulated air emboli.

In further embodiments, a system may include a clamp, an articulator, a simulator module and a display module. The clamp may define a space to receive a conduit of an ECMO circuit. The articulator may be operably coupled to the clamp to change a dimension of the space. The simulator module may be communicatively coupled to the articulator to transmit control signals. The simulator module may include a wireless interface to communicatively couple with a user device. The display module may be coupled to the simulator module and configured to generate simulated parameters to be displayed to a user via a display.

In some aspects, the simulated parameters include $PaO_2$, $PaCO_2$, $SaO_2$, $SvO_2$, arterial temperature, venous temperature, Hb, Hct, blood flow rate, ACT, TEG, PTT or aPTT. In some embodiments, the display module is configured to change the simulated parameters based on inputs received at the user device.

In further embodiments, a system may include an ECMO circuit including one or more conduits extending between a number of components. The system may include one or more flow regulating members positioned about at least one of the one or more conduits. The flow regulating members may be structured to adjustably compress an exterior of the at least one of the one or more conduits in order to control flow through the one or more conduits.

In further embodiments, a system may include an ECMO circuit including one or more conduits extending between a number of components. The system may include at least one connecting member coupled with at least one of the one or more conduits. The system may include at least one injection device coupled with the at least one connecting member. The injection device may be structured to inject a quantity of one or more gases or ambient air through the connecting member and into the conduit. In some aspects, the quantity of the one or more gases or ambient air corresponds to amount quantified for simulating an air embolism.

In further embodiments, a method for ECMO training includes operating an ECMO simulation circuit including at least one conduit and at least one flow regulating device positioned about the conduit at a first location to simulate a first operating condition. The flow regulating device may be structured to adjustably compress an exterior of the conduit in order to control flow through the conduit. The method may include repositioning the flow regulating device from the first location to a second location positioned about the conduit during operation of the ECMO simulation circuit. The method may include operating the ECMO simulation circuit after repositioning the flow regulating device to simulate a second operating condition.

The embodiments described in this disclosure may include the use of a special purpose or general-purpose computer including various computer hardware or software modules, as discussed in greater detail below.

Embodiments within the scope of this disclosure also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this disclosure, the term "module" or "component" may refer to software objects or routines that execute on the computing system. The different components, modules, engines, and services described herein may be implemented as objects or processes that execute on the computing system (e.g., as separate threads). While the system and methods described herein are may be implemented in software, implementations in hardware or a combination of software and hardware are also possible and contemplated. In this description, a "computer" may be any computing system as previously defined herein, or any module or combination of modulates running on a computing system.

As used in this disclosure, the term "automatically" may refer to: one or more tasks accomplished without interaction by a user; one or more tasks accomplished without user interaction after activation by a user; and/or one or more tasks accomplished by a computer system with little or no direct human control.

For the processes and/or methods disclosed, the functions performed in the processes and methods may be implemented in differing order, as may be indicated by context. Furthermore, the outlined steps and operations are only provided as examples, and some of the steps and operations may be optional, combined into fewer steps and operations, or expanded into additional steps and operations.

This disclosure may sometimes illustrate different components contained within, or connected with, different other components. Such depicted architectures are merely exemplary, and many other architectures can be implemented which achieve the same or similar functionality.

The terms used in this disclosure, and in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.). In addition, if a specific number of elements is introduced, this may be interpreted to mean at least the recited number, as may be indicated by context (e.g., the bare recitation of "two recitations," without other modifiers, means at least two recitations, or two or more recitations). As used in this disclosure, any disjunctive word and/or phrase presenting two or more alternative terms should be understood to contemplate the possibilities of including one of the terms, either of the terms, or both terms. For example, the phrase "A or B" will be understood to include the possibilities of "A" or "B" or "A and B."

The terms and words used are not limited to the bibliographical meanings, but, are merely used to enable a clear and consistent understanding of the disclosure. It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those skilled in the art, may occur in amounts that do not preclude the effect the characteristic was intended to provide.

Aspects of the present disclosure may be embodied in other forms without departing from its spirit or essential characteristics. The described aspects are to be considered in all respects illustrative and not restrictive. The claimed subject matter is indicated by the appended claims rather than by the foregoing description. All changes which come within the meaning and range of equivalency of the claims are to be embraced within their scope.

What is claimed is:

1. A system, comprising:
    a pump configured to displace gas and to removably couple with a connector on a conduit of an extracorporeal membrane oxygenation ("ECMO") circuit; and
    a simulator module communicatively coupled to the pump to transmit control signals for the pump to displace gas into the conduit of the ECMO circuit, the simulator module including a wireless interface to communicatively couple with a user device.

2. The system of claim 1, wherein the connector on the conduit is positioned between an oxygenator and a heat exchanger in the ECMO circuit.

3. The system of claim 1, further comprising a clamp defining a space to receive a second conduit of the ECMO circuit and an articulator operably coupled to the clamp to change a dimension of the space.

4. The system of claim 1, wherein the simulator module is configured to activate the pump based on inputs received at the user device.

5. The system of claim 4, wherein activating the pump generates a simulated air emboli.

6. A method for extracorporeal membrane oxygenation ("ECMO") training, comprising:
    operating an ECMO simulation circuit comprising at least one conduit and at least one flow regulating device positioned about the at least one conduit at a first location to simulate a first operating condition, the at least one flow regulating device being structured to adjustably compress an exterior of the at least one conduit in order to control flow through the at least one conduit; and
    during operation of the ECMO simulation circuit repositioning the at least one flow regulating device from the first location to a second location positioned about the at least one conduit.

7. The method of claim 6, further comprising operating the ECMO simulation circuit after repositioning the at least one flow regulating device to simulate a second operating condition.

* * * * *